United States Patent
Takemoto et al.

(10) Patent No.: US 9,850,139 B2
(45) Date of Patent: *Dec. 26, 2017

(54) LITHIUM TITANATE POWDER FOR ELECTRODE OF ENERGY STORAGE DEVICE, ACTIVE MATERIAL, AND ENERGY STORAGE DEVICE USING THE SAME

(71) Applicant: UBE INDUSTRIES, LTD., Ube-Shi (JP)

(72) Inventors: Hirofumi Takemoto, Ube (JP); Yoshizumi Tanaka, Ube (JP); Hiroshi Fujino, Ube (JP); Yasumasa Iwamoto, Minato-ku (JP)

(73) Assignee: UBE INDUSTRIES, LTD., Ube-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/312,494

(22) PCT Filed: May 21, 2015

(86) PCT No.: PCT/JP2015/064633
§ 371 (c)(1),
(2) Date: Nov. 18, 2016

(87) PCT Pub. No.: WO2015/178457
PCT Pub. Date: Nov. 26, 2015

(65) Prior Publication Data
US 2017/0107117 A1    Apr. 20, 2017

(30) Foreign Application Priority Data

May 21, 2014  (JP) ................. 2014-105534
Mar. 4, 2015  (JP) ................. 2015-042837

(51) Int. Cl.
| | |
|---|---|
| H01M 4/485 | (2010.01) |
| C01G 23/00 | (2006.01) |
| H01M 10/0525 | (2010.01) |
| H01G 11/06 | (2013.01) |
| H01G 11/46 | (2013.01) |
| H01G 11/50 | (2013.01) |
| H01M 4/02 | (2006.01) |

(52) U.S. Cl.
CPC ........... *C01G 23/005* (2013.01); *H01G 11/06* (2013.01); *H01G 11/46* (2013.01); *H01G 11/50* (2013.01); *H01M 4/485* (2013.01); *H01M 10/0525* (2013.01); *C01P 2002/60* (2013.01); *C01P 2004/03* (2013.01); *C01P 2006/12* (2013.01); *C01P 2006/40* (2013.01); *H01M 2004/027* (2013.01); *H01M 2004/028* (2013.01)

(58) Field of Classification Search
CPC ........................... H01M 4/485; C01G 23/005
See application file for complete search history.

(56) References Cited

U.S. PATENT DOCUMENTS

| | | |
|---|---|---|
| 2006/0257746 A1 | 11/2006 | Inagaki et al. |
| 2008/0254363 A1 | 10/2008 | Matsui et al. |
| 2009/0127503 A1 | 5/2009 | Endo et al. |
| 2009/0291354 A1 | 11/2009 | Inagaki et al. |
| 2011/0268998 A1 | 11/2011 | Inagaki et al. |
| 2013/0052488 A1 | 2/2013 | Inagaki et al. |
| 2013/0105730 A1 | 5/2013 | Wagawa et al. |
| 2013/0244114 A1 | 9/2013 | Yamamoto et al. |
| 2013/0337302 A1 | 12/2013 | Inagaki et al. |
| 2014/0312269 A1 | 10/2014 | Laumann et al. |
| 2016/0164086 A1 | 6/2016 | Yamamoto et al. |

FOREIGN PATENT DOCUMENTS

| | | |
|---|---|---|
| JP | 2003-335519 A | 11/2003 |
| JP | 2004-235144 A | 8/2004 |

(Continued)

OTHER PUBLICATIONS

Office Action dated Nov. 21, 2016 in co-pending U.S. Appl. No. 14/915,532.
International Search Report dated Aug. 11, 2015, in PCT/JP2015/064633, filed May 21, 2015.
International Search Report dated Dec. 2, 2014, in PCT/JP2014/072780, filed Aug. 29, 2014.
Japanese Office Action dated Apr. 20, 2015, in Japanese Patent Application No. 2015-042837 filed Mar. 4, 2015 (with English-language translation).
Japanese Office Action dated Nov. 20, 2014, in Japanese Patent Application No. 2014-551358 (with English-language translation).

*Primary Examiner* — Peter F Godenschwager
(74) *Attorney, Agent, or Firm* — Oblon, McClelland, Maier & Neustadt, L.L.P.

(57) ABSTRACT

Provided is a lithium titanate powder for an electrode of an energy storage device, an active material containing the same, and an energy storage device using the active material. The lithium titanate powder comprises $Li_4Ti_5O_{12}$ as a main component, and wherein, when a volume surface diameter calculated from specific surface area determined by the BET method is $D_{BET}$ and a crystallite diameter calculated from half-peak width of (111) plane of $Li_4Ti_5O_{12}$ by the Scherrer equation is $D_X$, $D_{BET}$ is 0.1 to 0.6 μm; $D_X$ is larger than 80 nm; $D_{BET}/D_X$ (μm/μm), ratio of $D_{BET}$ to $D_X$, is 3 or less; M (wherein M is at least one type of metal element selected from a group consisting of Mg, Zn, Al, Ga, and In) is contained; and when atomic concentrations of the M and titanium at 5 nm inner positions from a surface of a lithium titanate particle are D1 (atm %) and Dti (atm %) respectively, and when atomic concentration of the M at 100 nm inner position from the lithium titanate particle surface is D2 (atm %), following formulas (I) and (II) are satisfied.

$$D1/D2 \geq 5 \qquad (I)$$

$$0.02 \leq D1/Dti \leq 0.4 \qquad (II)$$

14 Claims, 3 Drawing Sheets

(56) References Cited

FOREIGN PATENT DOCUMENTS

| | | | |
|---|---|---|---|
| JP | 2006-318797 | A | 11/2006 |
| JP | 4435926 | B2 | 3/2010 |
| JP | 2011-154928 | A | 8/2011 |
| JP | 2012-006816 | A | 1/2012 |
| JP | 2012-222266 | A | 11/2012 |
| JP | 2013-051104 | A | 3/2013 |
| JP | 2013-95646 | A | 5/2013 |
| JP | 2013-234102 | A | 11/2013 |
| WO | 2006/106700 | A1 | 12/2006 |
| WO | 2012/029697 | A1 | 3/2012 |

LITHIUM TITANATE POWDER FOR ELECTRODE OF ENERGY STORAGE DEVICE, ACTIVE MATERIAL, AND ENERGY STORAGE DEVICE USING THE SAME

TECHNICAL FIELD

The present invention relates to a lithium titanate powder preferable such as for electrode material of an energy storage device, and to an active material including the lithium titanate powder and energy storage device using the active material in an positive electrode or negative electrode.

BACKGROUND ART

Recently, various types of materials have been studied as electrode material for energy storage devices. Among the materials, lithium titanate is attracting attention for its superior input-output performance when used as an active material. Further, when using as an energy storage device to be mounted on a vehicle, since it will be used in extremely cold regions, development of an active material with excellent input performance at very low temperature like −30° C. is desired.

Patent Document 1 discloses lithium titanate containing $Li_{4/3}Ti_{5/3}O_4$ as a main component, having a main peak intensity of 5 or less in each of anatase-type titanium dioxide, rutile-type titanium dioxide, and $Li_2TiO_3$ when the intensity of the main peak for $Li_{4/3}Ti_{5/3}O_4$ determined by X-ray diffraction analysis using Cu target is defined to be 100, and with high crystallinity having a crystallite diameter of 700 Å to 800 Å (70 nm to 80 nm), which is determined from a half-peak width of the peak in 4.83 Å with the Scherrer equation. According to Patent Document 1, high initial charge-discharge capacity is achieved by the peak intensity being as small as 5 or less in lithium titanate components other than $Li_4Ti_5O_{12}$ and very high crystallinity having a crystallite diameter of within the range of 70 nm to 80 nm.

Patent Document 2 discloses a lithium-titanium complex oxide containing $Li_4Ti_5O_{12}$ as a main component, in which when the main peak intensity detected for each phase of $Li_4Ti_5O_{12}$, $Li_2TiO_3$, and $TiO_2$ in an X-ray diffraction pattern is I1, I2, and I3 respectively, achieving I1/(I1+I2+I3) of 96% or more, having a crystallite diameter, which is determined from the half-peak width of the peak in the X-ray diffraction pattern for the (111) plane of $Li_4Ti_5O_{12}$ with the Scherrer equation, of 520 Å to 590 Å (52 nm to 59 nm), preferably having a ratio of volume surface diameter determined by the BET method to the crystallite diameter, that is volume surface diameter/crystallite diameter, of 4 or less, and further preferably, having specific surface area determined by the BET method of 8 to 12 m²/g and maximum primary particle diameter of 1.5 μm or less. According to Patent Document 2, lithium-titanium complex oxide having a crystallite diameter within the above range can form fine particles while having high crystallinity, and is considered to exhibit high-rate performance while having a high initial capacity of 160 mAh/g for example.

Patent Document 3 discloses a lithium-titanium complex oxide containing $Li_4Ti_5O_{12}$ as a main component, having a crystallite diameter of 690 Å or less, and wherein, when the main peak intensity of spinel type lithium titanate by the X-ray diffraction analysis is 100, the main peak intensities of rutile-type $TiO_2$, anatase-type $TiO_2$, and $Li_2TiO_3$ are all 7 or less. According to Patent Document 3, as the crystallite diameter is made smaller and impurity phases are made fewer, diffusion speed of lithium ion becomes faster and ionic conductivity of lithium improves, thus it is said that high input performance at room temperature is realized.

Patent Document 4 discloses a lithium-titanium complex oxide that has a spinel-type structure and that is represented with a compositional formula $Li[Li_{(1-2x)/3}Mg_xTi_{(5-x)/3}]O_4$ (0.025≤x≤0.063). According to Patent Document 4, by replacing a part of titanate site of lithium titanate by magnesium, electron conductivity of active material improves and high output performance is achieved at −30° C.

RELATED DOCUMENT

Patent Document

Patent Document 1: JP 4435926
Patent Document 2: JP 2013-95646 A
Patent Document 3: JP 2006-318797 A
Patent Document 4: JP 2011-154928 A

SUMMARY OF INVENTION

Problems to be Solved by Invention

A lithium-ion secondary battery manufactured by using lithium titanate of Patent Document 1 as a positive electrode active material, as described in paragraph [0012] of Patent Document 1, lithium titanate of Patent Document 1 has high initial charge-discharge capacity due to large crystallite diameter of lithium titanate as large as 773 Å at the maximum. However, by using lithium titanate of Patent Document 1, input-output performance as a battery is inferior due to larger primary particle diameter along with larger crystallite diameter, as pointed out in paragraph [0005] of Patent Document 2. Also, as pointed out in paragraph [0005] of Patent Document 2, although primary particle diameter can be made smaller by milling obtained lithium titanate, in such a case, crystallite diameter also becomes small.

The lithium-titanium complex oxide of Patent Document 2, having BET diameter/crystallite diameter of 2.4 to 3.1, is a powder having a smaller BET diameter compared to a crystallite diameter, that it is considered to have satisfactory input-output performance for a battery. However, its crystallite diameter is 558 Å at the maximum, thus the initial charge-discharge capacity becomes small. Although, it is said that a milling method that can suppress decrease in crystallite diameter is used, it can be estimated that the crystallite diameter became small due to the milling after calcination.

The lithium-titanium complex oxide in Patent Document 3 exhibits good input performance at room temperature. However, improving ionic conductivity of lithium by reducing crystallite diameter and impurity phases provides insufficient input performance at −30° C. and its performance is not satisfactory for use in an energy storage device for vehicles.

The lithium-titanium complex oxide in Patent Document 4 has high electron conductivity and exhibits high output performance at −30° C. However, as for input performance at −30° C., electron conductivity is scarcely influenced. Also, since replacement with magnesium is uniformly performed to the entire crystal, magnesium acts as an impurity and diffusion speed of lithium ion in the crystal decreases. Subsequently, input performance at −30° C. becomes inferior and its performance becomes insufficient for use in an energy storage device for vehicles.

As above mentioned, a lithium titanate powder having large initial charge-discharge capacity, superior input performance, and superior input performance also at very low temperature when it is used as electrode material for energy storage devices such as a lithium-ion battery has not been obtained yet.

To solve above problems, an objective of the present invention is to provide a lithium titanate powder that exhibits a large initial charge-discharge capacity, superior input-output performance, and superior input performance at very low temperature when it is used as electrode material for energy storage devices, an active material including the lithium titanate powder, and an energy storage device using the active material.

Means for Solving Problems

The present inventors have studied intensively to achieve the above-mentioned objectives, and finally have found lithium titanate powder having specific size of BET diameter and crystallite diameter, having the size of the BET diameter relative to the crystallite diameter of equal to or less than a specific value, containing a specific metal element, where a concentration ratio of the metal element on the particle surface to that of the inner particle is equal to or more than a specific value and a concentration ratio of the metal element on the particle surface to Ti on the particle surface is within a specific value. The inventors have also found that an energy storage device obtained by using the lithium titanate powder as electrode material exhibits large initial charge-discharge capacity, superior input-output performance, and superior input performance at very low temperatures, and thus completed the invention. Accordingly, the present invention relates to the following items.

(1) A lithium titanate powder for an electrode of an energy storage device comprising $Li_4Ti_5O_{12}$ as a main component, wherein, when a volume surface diameter calculated from specific surface area determined by the BET method is represented as $D_{BET}$, and when a crystallite diameter calculated from half-peak width of the peak for the (111) plane of $Li_4Ti_5O_{12}$ by the Scherrer equation is represented as $D_X$, $D_{BET}$ is 0.1 to 0.6 μm, $D_X$ is larger than 80 nm, $D_{BET}/D_X$ (μm/μm), ratio of $D_{BET}$ to $D_X$ is 3 or less, the lithium titanate powder contains M (wherein M is at least one type of metal element selected from the group consisting of Mg, Zn, Al, Ga, and In), in a cross-sectional analysis of a lithium titanate particle using a scanning transmission electron microscope, when atomic concentration of the M and atomic concentration of titanium measured by energy dispersive X-ray spectroscopy at the 5 nm inner position from a surface of the lithium titanate particle along a straight line drawn vertically to tangent of the lithium titanate particle surface are D1 (atm %) and Dti (atm %) respectively, and when atomic concentration of the M at 100 nm inner position from the surface of the lithium titanate particle along the straight line is D2 (atm %), following formulas (I) and (II) are satisfied.

$$D1/D2 \geq 5 \quad (I)$$

$$0.02 \leq D1/Dti \leq 0.4 \quad (II)$$

(2) The lithium titanate powder for an electrode of an energy storage device according to (1) wherein a following formula (III) is satisfied.

$$0.02 \leq D1/Dti \leq 0.3 \quad (III)$$

(3) The lithium titanate powder for an electrode of an energy storage device according to (1) or (2), wherein $D_{BET}/D_X$ (μm/μm), the ratio of $D_{BET}$ to $D_X$ is 2 or less.

(4) The lithium titanate powder for an electrode of an energy storage device according to any one of (1) to (3), wherein $T_M/T_{Ti}$, the atomic ratio of M to Ti for the entire lithium titanate powder measured by the inductivity coupled plasma emission spectrometric analysis is 0.001 to 0.05.

(5) An active material comprising a lithium titanate powder for an electrode of an energy storage device according to any one of (1) to (4).

(6) An electrode sheet of an energy storage device comprising an active material according to (5).

(7) An energy storage device, wherein an active material according to (5) is used.

(8) A lithium-ion secondary battery, wherein an active material according to (5) is used.

(9) A hybrid capacitor, wherein an active material according to (5) is used.

Effect of Invention

In accordance with the present invention, there can be provided lithium titanate powder suitable for use as electrode material for energy storage devices having large initial charge-discharge capacity, superior input-output performance, and superior input performance at extremely low temperature, an active material, and an energy storage device.

MODES FOR CARRYING OUT THE INVENTION

[Lithium Titanate Powder]

Figure 1:
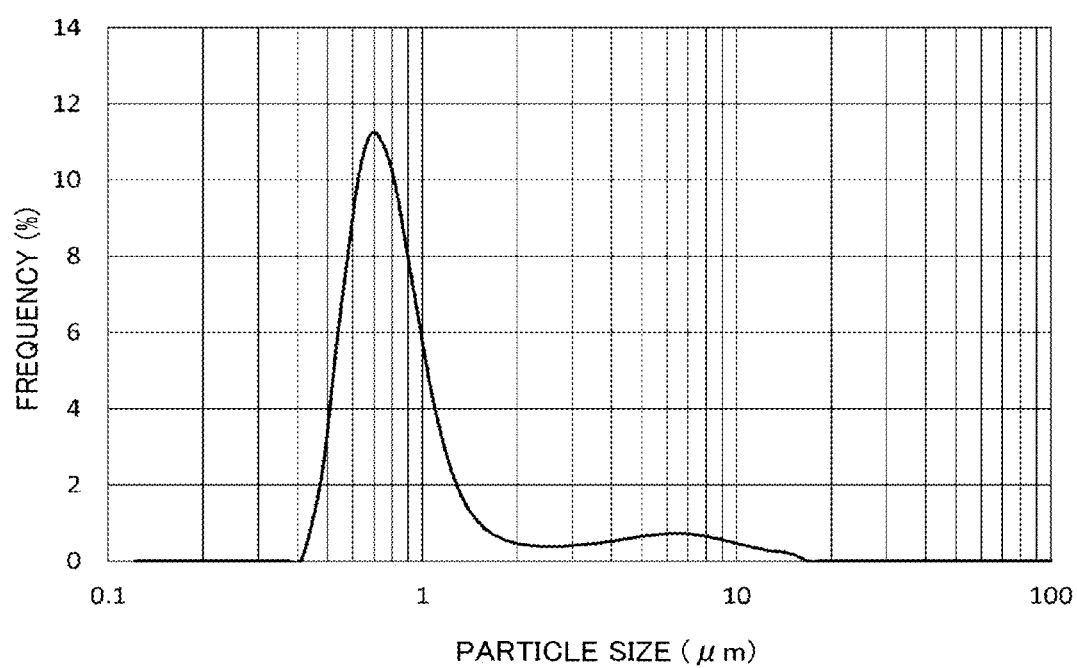
FIG. 1 is a particle size distribution curve of a mixed powder in the mixed slurry before milling in Reference Example 1.

The lithium titanate powder of the present invention is containing $Li_4Ti_5O_{12}$ as a main component, and when a volume surface diameter calculated from specific surface area determined by the BET method is represented as $D_{BET}$ and a crystallite diameter calculated from half-peak width of the peak for the (111) plane of $Li_4Ti_5O_{12}$ by the Scherrer equation is represented as $D_X$, $D_{BET}$ is 0.1 to 0.6 μm, $D_X$ is larger than 80 nm, and $D_{BET}/D_X$ (μm/μm), ratio of $D_{BET}$ to $D_X$ is 3 or less, including M (wherein M is at least one type of metal element selected from the group consisting of Mg, Zn, Al, Ga, and In), in cross-sectional analysis of a lithium titanate particle using a scanning transmission electron microscope, when atomic concentration of the M and atomic concentration of titanium measured by energy dispersive X-ray spectroscopy at the 5 nm inner position from a surface of the lithium titanate particle along a straight line drawn vertically to tangent of the lithium titanate particle surface are D1 (atm %) and Dti (atm %) respectively, and when atomic concentration of the M at 100 nm inner position from the surface of the lithium titanate particle along the straight line is D2 (atm %), following formulas (I) and (II) are satisfied.

$$D1/D2 > 5 \quad (I)$$

$$0.02 \leq D1/Dti \leq 0.4 \quad (II)$$

Here, containing $Li_4Ti_5O_{12}$ as a main component means that, when peak intensity that corresponds to the main peak of $Li_4Ti_5O_{12}$ among the peaks measured by the X-ray diffraction analysis is defined to be 100, the main peak intensity of anatase-type titanium dioxide is 5 or less, the main peak intensity of rutile-type titanium dioxide is 5 or less, and the peak intensity that corresponds to the main peak of $Li_2TiO_3$ is 5 or less. However, if such components other than $Li_4Ti_5O_{12}$ exist, the content amount of $Li_4Ti_5O_{12}$ relatively decreases and thus causes smaller charge-discharge capacity and inferior high-rate performance. Accordingly, the content amount of such components other than $Li_4Ti_5O_{12}$ should preferably be kept small. Particularly, since rutile-type titanium dioxide brings significant undesirable influences in charge-discharge capacity and high-rate performance, main peak intensity of rutile-type titanium dioxide is preferably 3 or less.

For the lithium titanate powder of the present invention, Li/Ti, atomic ratio of Li to Ti is preferably 0.79 to 0.85. When the atomic ratio is within this range, the ratio of $Li_4Ti_5O_{12}$ in the lithium titanate powder increases and the initial charge-discharge capacity of an energy storage device where the lithium titanate powder of the present invention is applied as electrode material increases. From this point of view, the atomic ratio Li/Ti is more preferably 0.80 to 0.85, and further preferably 0.81 to 0.85.

In the present invention, a crystallite diameter calculated from a half-peak width of the peak of (111) plane of $Li_4Ti_5O_{12}$ by the Scherrer equation is represented as $D_X$. $D_X$ of the lithium titanate powder in the present invention is larger than 80 nm, preferably 90 nm or more, more preferably 100 nm or more, particularly preferably 200 nm or more. As $D_X$ becomes larger, the initial charge-discharge capacity of the energy storage device for which the lithium titanate powder of the present invention is applied as electrode material, increases. Further, $D_X$ of the lithium titanate powder of the present invention is preferably 500 nm or less. When $D_X$ becomes larger than 500 nm, $D_{BET}$ may increase and may result in inferior input-output performance. The measurement method for $D_X$ is explained later at "(2) Crystallite diameter ($D_X$)" in [Method of measuring physical properties].

In the present invention, volume surface diameter of the lithium titanate powder of the present invention calculated from specific surface area determined by BET method is represented as $D_{BET}$. $D_{BET}$ of the lithium titanate powder of the present invention is 0.1 μm to 0.6 μm, preferably 0.2 μm to 0.5 μm, further preferably 0.3 μm to 0.5 μm. A measurement method of $D_{BET}$ is explained later at "(5) BET diameter ($D_{BET}$)" in [Method of measuring physical properties], where it is a value calculated from a BET specific surface area of the lithium titanate powder in the present invention as explained in <BET specific surface area>below.

$D_{BET}/D_X$ (μm/μm), the ratio of $D_{BET}$ to $D_X$ of the lithium titanate powder of the present invention is 3 or less. Preferably, $D_{BET}/D_X$ is 2 or less, and more preferably 1.5 or less. As $D_{BET}/D_X$ becomes small, input-output performance of an energy storage device to which lithium titanate powder of the present invention is applied as electrode material becomes better. Further, diffusion of Li ions within a particle is less likely to be blocked that input performance at very low temperature (−30° C.) improves.

The lithium titanate powder of the present invention contains M as a different element (wherein M is at least one type of metal element selected from the group consisting of group 2 element, group 12 element, and group 13 element). As for M, at least one type of metal element selected from the group consisting of Mg, Zn, Al, Ga, and In is more preferable. Mg, Zn, Al, Ga, and In are the metal elements where their Pauling's ionic radius is within ±20 μm range from Pauling's ionic radius for $Ti^{4+}$ (that is, within 68 pm+20 pm range since Pauling's ionic radius for $Ti^{4+}$ is 68 pm), and have different ion valence from that of $Ti^{4+}$. Therefore, Ti site can be easily replaced and, according to the lithium titanate in the present invention, by generating a state where a specific different metal atom having different valence from that of Ti is locally contained in the lithium titanate surface at relatively low concentration, it is speculated that charge transfer energy when moving Li ions from electrolyte solution into lithium titanate can be made smaller.

Regarding the content amount of M, $T_M/T_{Ti}$, atomic ratio of M to Ti for the entire lithium titanate powder measured by the inductivity coupled plasma emission spectrometric analysis is preferably 0.001 to 0.05. Particularly preferably, the lower limit value for $T_M/T_{Ti}$ is 0.01 or more, and the upper limit value is 0.03 or less.

M is contained more in the surface region than in the inner region of each individual lithium titanate particle constituting lithium titanate powder. In cross-sectional analysis of a lithium titanate particle using a scanning transmission electron microscope, when atomic concentration of M measured by energy dispersive X-ray spectroscopy (EDS) at the 5 nm inner position from the surface of the lithium titanate particle along straight line drawn vertically to tangent of the lithium titanate particle surface is D1 (atm %), atomic concentration of titanium measured at the 5 nm inner position from the surface of the lithium titanate particle along the straight line is Dti (atm %), and when atomic concentration of M measured at the 100 nm inner position from the surface of the lithium titanate particle along the straight line is D2 (atm %), the following formulas (I) and (II) are satisfied.

$$D1/D2 > 5 \quad (I)$$

$$0.02 \leq D1/Dti \leq 0.4 \quad (II)$$

Also, when $T_M/T_{Ti}$, atomic ratio of M to Ti in the entire lithium titanate powder measured by the inductively coupled plasma emission spectrometric analysis method is represented as A, and when $C_M/C_{Ti}$, atomic ratio of M to Ti on the particle surface of lithium titanate powder measured by X-ray photoelectron spectroscopy is represented as B, preferably the following formula (1) is satisfied. As for X-ray photoelectron spectroscopy, a method where Mg-Kα ray is used for an X-ray source or the like can be mentioned.

$$B/A \geq 1.5 \quad (1)$$

As above mentioned, when M is contained more in the surface region than in the inner region of a lithium titanate particle constituting lithium titanate powder, input performance at low temperature is further improved.

In order to further improve input performance at very low temperatures, D1/Dti mentioned above preferably satisfies the following formula (2) and more preferably satisfies the following formula (3).

$$0.02 \leq D1/Dti \leq 0.3 \quad (2)$$

$$0.02 \leq D1/Dti \leq 0.1 \quad (3)$$

Likewise, in order to further improve input performance at very low temperatures, B/A mentioned above, preferably satisfies following formula (4).

$$B/A > 5 \quad (4)$$

Similarly, in order to further improve input performance at very low temperatures, D1 is preferably 10 or less, more preferably 5 or less, and most preferably 3 or less.

During the input, that is, when lithium titanate absorbs Li ions, mainly diffusion of Li ions inside a lithium titanate particle limits the input performance under the room temperature. However, under a very low temperature like −30° C., both Li diffusion inside a lithium titanate particle and charge transfer resistivity (may be called as reaction resistance) at the interface between lithium titanate and electrolyte solution are considered to limit the input performance. Although it is only a speculation, for the following reasons, lithium titanate of the present invention is considered to be capable of significantly improving input performance not only at room temperatures but also at very low temperatures like −30° C.

According to lithium titanate of the present invention, by generating a state where a specific different metal atom having different valence from that of Ti are locally contained to the lithium titanate surface at relatively low concentration, charge transfer energy when the Li ion moves into lithium titanate from electrolyte solution can be reduced. Further, when a different metal atom exists at high concentration inside the lithium titanate particle, diffusion speed of the Li ions decreases because the Li ions are dispersed in the vicinity of the site of the different metal atom. However, as to lithium titanate of the present invention, since almost no different metal atoms exist inside a particle, such concern is unnecessary. Furthermore, almost no crystal grain boundaries exist inside the particle of lithium titanate of the present invention. In other words, since $D_{BET}/D_X$ is less than 3, it is considered that Li ion diffusion inside the particle is not easily hindered.

<Volume-Median Particle Diameter>

The lithium titanate powder of the present invention can be either powder obtained without granulation operation or powder obtained after granulation operation performed before or after calcination. If it is a powder obtained without granulation operation, the volume-median particle diameter (average particle size, hereafter indicated as D50) of the lithium titanate powder of the present invention is 0.01 to 2 μm. In order to suppress aggregation of the lithium titanate powder and to improve its handling during preparation of electrode, D50 for the lithium titanate powder of the present invention obtained without granulation is preferably 0.1 μm or more, and 1 μm or less to improve input-output performance. From these points, D50 of the lithium titanate powder of the present invention obtained without granulation operation is more preferably 0.1 to 1 μm, further preferably 0.2 to 0.9 μm. On the other hand, if it is the powder obtained after granulation operation, D50 of the lithium titanate powder in the present invention is preferably 50 μm or less.

Here, D50 indicates a particle diameter where a volume cumulative frequency calculated in volume fraction becomes 50% when integrated from smaller particles. The measurement method is explained later at "(3) Volume-median particle diameter (D50)" in [Method of measuring physical properties].

<BET Specific Surface Area>

From the perspective of improving input-output performance, a BET specific surface area of the lithium titanate powder in the present invention (hereafter may be simply called as "specific surface area") is preferably 3 $m^2/g$ or more, and more preferably 5 $m^2/g$ or more. Further, from the perspective of reducing the solvent amount used in preparation of slurry when dispersing lithium titanate powder to solvent at the process of manufacturing electrode, the specific surface area is further preferably 10 $m^2/g$ or less.

<pH>

The pH of the lithium titanate powder in the present invention is preferably 7 to 12.

If the pH is 7 or more, an advantage of good dispersibility can be obtained, and if it is 12 or less, an advantage of avoiding a problem of slurry gelation when preparing an electrode can be obtained. From these points, the upper limit value is preferably 11.5 or less, and more preferably 11 or less. Here, the pH of the lithium titanate powder indicates that of supernatant of dispersion liquid prepared by 10 g of lithium titanate powder dispersed to 90 g of water.

[Method of Manufacturing Lithium Titanate Powder]

The lithium titanate powder of the present invention can be obtained through a process of milling and mixing a Ti source and Li source, a process of calcination at high temperature in short time (short-time high-temperature), a process of adding and mixing M source, a process of subjecting lithium titanate powder containing the M source to heat treatment, and post-processing processes such as deagglomeration, classification, and magnetic separation performed as required.

When raw materials are simply mixed, reaction does not proceed sufficiently in short-time high-temperature calcination, thus different phases such as $Li_2TiO_3$ and rutile-type titanium dioxide are formed in the obtained lithium titanate powder. As these different phases cause decrease in charge-discharge capacity, it is essential to obtain a lithium titanate powder with less different phases even by short-time high-temperature calcination. For this purpose, Ti source and Li source of raw materials (titanium compound and lithium compound) need to be mixed sufficiently. To mix sufficiently, particle size of lithium compound has to be particularly small.

<Preparation Process of Raw Material Mixture of Ti and Li Source>

As Ti source for the lithium titanate powder of the present invention, titanium compounds such as anatase-type titanium dioxide and rutile-type titanium dioxide are used. It is preferable that Ti source reacts easily with Li source in a short time, and from this point of view, anatase-type titanium dioxide is preferable. The volume-median particle diameter of Ti source (average particle size, D50) is 0.01 to 2 km. In order to ensure sufficient reaction of raw materials in a short time, 2 μm or less is preferable, and to improve handling properties, 0.1 μm or more is preferable. From these points, D50 is more preferably 0.1 to 2 μm.

As for the Li source of the lithium titanate powder of the present invention, lithium compounds such as lithium hydroxide monohydrate, lithium oxide, lithium hydrogencarbonate, and lithium carbonate are used. In the perspective of calcining at a high temperature, a lithium compound with higher melting point is preferable, and lithium carbonate is particularly preferable.

In the present invention, a mixture containing above raw materials is prepared so as to achieve D95 of the mixed powder at particle size distribution curve measured by a laser diffraction/scattering particle size analyzer becomes 5 μm or less before calcination. Here, D95 means the particle diameter where volume cumulative frequency calculated in volume fraction becomes 95% when integrated from smaller particles. The mixture can be a mixed powder prepared as above, or a granulated powder obtained by granulation of the mixed powder prepared as above. Further, the mixture for calcination can be in a form of slurry including the mixed powder or granulated powder above. If the mixture is a granulated powder, D95 of the granulated powder does not need to be 5 μm or less as long as it is the granulated powder obtained by granulating the mixed powder having D95 of 5 μm or less.

As for a preparation method of a mixture, the following methods can be adopted. The first method is that the compounded raw materials are mixed and milled simultaneously. The second method is that lithium compound raw material is milled until its D95 after mixing becomes 5 μm or less and then either simply mixed or mixed with light milling. The third method is that fine particle of lithium compound is first prepared by crystallizing the lithium compound as a raw material or the like, classified as required, and then simply mixed or mixed with light milling. Among these methods, the first method where raw materials are milled and mixed simultaneously is industrially beneficial as it has fewer processes. Further, a conductive agent may be added at the same time.

In any of the first to third methods above, there are no particular restrictions to the mixing method of raw materials, either wet or dry mixing can be used. For example, a Henschel mixer, ultrasonic dispersing apparatus, homo mixer, mortar, ball mill, centrifugal ball mill, planetary ball mill, vibratory ball mill, attritor type high-speed ball mill, bead mill, roll mill, etc., can be used.

If the obtained mixture is a mixed powder, it can be used for next calcination process as it is. If the obtained mixture is mixed slurry containing the mixed powder, then it can be used for next calcination process after dried and granulated with a spray dryer or the like. If a rotary kiln is used for calcination, then the mixed slurry can be used as it is.

<Calcination Process>

The following is the calcination of the mixture. In the perspective of making particle size of powder obtained by calcination smaller and the crystallite diameter larger, preferably calcination is done in a short-time high-temperature. From this viewpoint, the maximum temperature during calcination is 800 to 1100° C., more preferably 850 to 1100° C., and further preferably 900 to 1000° C. Similarly, from the viewpoint above, a time for retaining the maximum temperature during calcination is preferably 2 to 90 minutes, more preferably 5 to 60 minutes, and further preferably 5 to 45 minutes. If the maximum temperature during calcination is high, a shorter retaining time is selected. Likewise, from the viewpoint of making the particle diameter of the powder obtained by the calcination and making the crystallite diameter larger, in a heat-up process during calcination, length of time stayed within 700 to 800° C. particularly short, for example, 15 minutes or less, is necessary.

The calcination method is not particularly limited, as long as it can be calcined at above conditions. As for calcination furnace, a fixed-bed furnace, a roller-hearth kiln, a mesh-belt kiln, a fluidized-bed furnace, and a rotary kiln can be used. However, to perform calcination efficiently in a short time, a roller-hearth kiln, a mesh-belt kiln, or a rotary kiln is preferable. If a roller-hearth kiln or mesh-belt kiln in which a mixture is stored in a saggar for calcination is used, the amount of mixture contained in the saggar is preferably kept small in order to keep lithium titanate quality stable, which is achieved by keeping temperature distribution of the mixture uniform during calcination.

The rotary kiln is particularly preferable for manufacturing lithium titanate powder of the present invention from the perspective of no need of containers for storing mixture so that mixture can be added continuously, and uniform heat history to the calcined object so as to obtain homogenous lithium titanate powder.

There is no particular limitation to calcination atmosphere in any calcination furnaces as long as desorbed water and carbon dioxide can be eliminated from the atmosphere. Generally, an atmosphere with compressed air is used, however, oxygen, nitrogen, or hydrogen atmosphere, etc., may be used.

<Post-Processing Process>

The lithium titanate powder after calcination obtained as above has slight aggregation but does not require such milling to break particles, and only deagglomeration and classification that disentangle aggregation are applied as needed.

The lithium titanate powder of the present invention has a large crystallite diameter, since crystallite size after calcination is large and kept large without degradation by milling after calcination.

A mixture related to the present invention is composed of a mixed powder where Ti source and Li source are mixed uniformly, and where relatively large particles are few. Specifically, the mixture is composed of a mixed powder prepared to have D95 of 5 Lm or less, or a granulated powder of the said mixed powder. If the mixture containing a mixed powder, where particle size distribution is not adjusted, is calcined at short-time high-temperature, a lithium titanate powder having a large crystallite diameter can be obtained, however, the ratio of different phases such as $Li_2TiO_3$ and rutile-type titanium dioxide is increased. Thus, charge-discharge capacity decreases. Whereas, if calcination time is made longer, the content amount of different phases decreases, but a BET diameter becomes large and the lithium titanate powder of the present invention cannot be obtained.

It is speculated that, in the present invention, lithium titanate powder with large crystallite diameter and with smaller BET diameter compared to crystallite diameter is obtained for the following reasons.

A calcination temperature between 700 and 800° C. is the temperature range where crystal nucleuses of lithium titanate start to generate. It is speculated that in the present invention, making the length of time stayed within the temperature range short suppresses the number of crystal nucleuses generated and enhances independent growth of each crystal nucleus, thus leading to a larger crystallite diameter in the obtained lithium titanate powder. On the other hand, calcination is preferably performed in short time at a low temperature in order to obtain a lithium titanate powder with a small BET diameter. However, under such calcination conditions, Ti source and Li source do not react sufficiently and lead to form different phases such as rutile-type titanium dioxide. In the present invention, it is speculated that BET diameter of the obtained lithium titanate powder can be made small while suppressing generation of different phases by reacting a Ti source and Li source sufficiently by: making a mixture for calcination to a condition such that Ti sources and Li sources at most places in the mixture can react easily in advance even in a short-time calcination, that is, fewer large particles which may take time to react sufficiently to the inside, and uniform mixture even locally; more specifically, preparing a mixed powder such that D95 becomes 5 μm or less; and subjecting a mixture composed of the mixed powder or a granulated powder obtained by granulating the mixed powder to a short-time calcination at a high temperature of 800° C. or more.

The lithium titanate powder of the present invention is obtained by calcining a mixed powder with D95 of 5 m or less composed of Ti source and Li source, or a mixture containing a granulated powder obtained by granulating the mixed powder, at a temperature of 800 to 1100° C. in a short-time, and also making length of time stayed within the temperature range of 700 to 800° C. short in a heat-up process during calcination. The lithium titanate powder of the present invention is obtained by using a mixed powder with D95 of 5 m or less, or a granulated powder obtained by granulating the mixed powder when calcining a mixture composed of Ti source and Li source at a temperature of 800 to 1100° C. and preferably, making length of time for maintaining 800° C. or more during calcination in a range of 2 to 90 minutes and length of time stayed within the temperature range of 700 to 800° C. in a heat-up process during calcination in a range of 15 minutes or less.

<Adding and Mixing Process of M Source>

The lithium titanate powder (hereinafter, may be indicated as the lithium titanate powder as the base material) obtained from the above processes is subjected to heat treatment after mixing with a compound containing M. As for compound containing M, any compound can be used as long as it is diffused by heat treatment. For example, oxide of M, hydroxide of M, and metal salt compound containing M can be used. In order to uniformly diffuse M onto the particle surface of lithium titanate powder, a wet-type method described later is suitable. In the wet-type method, preferably, compound containing M soluble to solvent is dissolved to its solvent and mixed with the lithium titanate powder as the base material. When compound containing M is metal salt compound containing M, from the perspective of achieving high charge-discharge capacity, an anionic species that does not leave impurities derived from the anionic species after heat treatment is suitable, for example, organic acid compound containing M or nitric acid compound containing M are preferable.

On the other hand, although fluoride of M can lower the pH, it is not preferable in the point that fluoride may easily replace the oxygen site of lithium titanate and decrease input performance at −30° C. Also, oxide and phosphorus compound of M are not preferable as they may decrease input performance at −30° C. since they strongly bind with metals and do not easily incur substitution reaction with lithium titanate.

There are no particular restrictions to the mixing method of the lithium titanate powder as the base material and compound containing M, and either wet mixing or dry mixing process can be used. However, in order to make the atomic concentration of M in the surface region of the lithium titanate powder higher than the atomic concentration of M in the inner region, it is preferable that compound containing M is dispersed uniformly onto the lithium titanate particle surface, and from this point, the wet mixing is preferable.

As for dry mixing, for example, paint mixer, Henschel mixer, ultrasonic dispersing apparatus, homo mixer, mortar, ball mill, centrifugal ball mill, planetary ball mill, vibratory ball mill, attritor type high-speed ball mill, bead mill, or roll mill, etc., can be used.

As for wet mixing, a compound containing M and lithium titanate powder are added to water or alcohol solvent and mixed in slurry state. As for alcohol solvent, such as methanol, ethanol, or isopropyl alcohol, having the boiling point of 100° C. or less is preferable in the point that the solvent can be easily removed. Moreover, in the perspective of ease of recovery and disposal, water solvent is industrially preferable.

As for solvent amount, it may be the amount where the solvent can make both compound containing M and lithium titanate particles wet. However, since the compound containing M and lithium titanate particles are preferably dispersed uniformly in the solvent, it is preferable that the solvent amount is set to be the amount where 50% or more of the compound containing M can be dissolved with respect to the total amount of compound containing M which is charged. The amount of the compound containing M dissolved into the solvent increases as temperature becomes higher, thus compound containing M and lithium titanate powder are preferably mixed under heating. By heating, the solvent amount can be reduced and thus mixing under heating is an industrially suitable method. The mixing temperature is preferably 40 to 100° C., more preferably 60 to 100° C.

In case of wet mixing, depending on heating method, it is preferable that solvent is removed before heat treatment after mixing process. The solvent is preferably removed and dried by evaporation. As for evaporation and drying methods of solvent, a method of evaporating solvent by heating while stirring with stirring blades, a method of using drying apparatus that enables drying while stirring such as a conical dryer, and a method of using a spray dryer can be used. If a rotary kiln is used for heat treatment, the slurry mixture can be charged into the kiln as it is.

<Heat Treatment Process after Adding and Mixing M Source>

After mixing lithium titanate powder as the base material with M source in the above process, the mixture is subjected to heat treatment so as to replace Ti site of lithium titanate on the particle surface by M. The heating method of heat treatment is not particularly limited. As a heat treatment furnace, such as a fixed-bed furnace, a roller-hearth kiln, a mesh-belt kiln, a fluidized-bed furnace, and a rotary kiln can be used. The atmosphere for heat treatment can be either air or inert gas such as nitrogen. If metal salt compound containing M is used for compound containing M, air atmosphere where anion species can be easily removed from the particle surface is preferable. The heat treatment temperature is preferably temperature where M disperses at least to the surface region of lithium titanate particle as the base material and where specific surface area does not decrease significantly by sintering of the lithium titanate as the base material. The upper limit value for the heat treatment temperature is 600° C., preferably 550° C., and more preferably 500° C. The lower limit value for the heat treatment temperature is 250° C. The length of heat treatment time is 0.5 to 8 hours, more preferably 2 to 5 hours. The temperature and length of time where M disperses at least to the surface region of lithium titanate particle as the base material vary depending on the reactivity of the compound containing M. For this reason, the temperature and length of time should be set accordingly.

[Active Material]

The active material of the present invention contains the lithium titanate powder. It may contain one or more materials other than the lithium titanate powder. As for other materials, for example, carbon materials [pyrolytic carbons, cokes, graphite (such as artificial graphite and natural graphite), organic polymer compound burned materials, and carbon fibers], tin or tin compound, and silicon or silicon compound are used.

[Energy Storage Device]

The energy storage device of the present invention is a device for storing and releasing energy by utilizing intercalation and deintercalation of lithium ions to electrodes containing the active material, such as a hybrid capacitor and lithium battery, etc.

[Hybrid Capacitor]

The hybrid capacitor is a device where an active material such as activated carbon that generates capacity by physical adsorption similar to that of electrode material in an electric double-layer capacitor, an active material such as graphite that generates capacity by physical adsorption and intercalation and deintercalation, and an active material such as a conductive polymer that generates capacity by redox are used for the positive electrode, and where the active material of the present invention is used for the negative electrode.

[Lithium Battery]

The lithium battery of the present invention includes both lithium primary battery and lithium secondary battery. Also, in this specification, the term lithium secondary battery is used on the basis of the concept to include so-called lithium-ion secondary batteries.

The lithium battery consists of a positive electrode, a negative electrode, non-aqueous electrolyte where electrolyte salt is dissolved into a non-aqueous solvent, and so on, and the active material can be used as electrode material. The active material may be used as either positive electrode active material or negative electrode active material. The following describes a case where the active material is used as the negative electrode active material.

<Negative Electrode>

A negative electrode contains a mixture layer including a negative electrode active material (the active material of the present invention), a conductive agent, and a binder on a single or both sides of a negative electrode current collector.

There are no particular restrictions to the conductive agent for a negative electrode, as long as it is electron conductive material that does not generate chemical changes. For example, graphite such as natural graphite (e.g., scale-like graphite) and artificial graphite, and carbon blacks such as acetylene black, Ketjenblack, channel black, furnace black, lamp black, and thermal black are used. Further, graphite and carbon blacks may be mixed accordingly for use. An amount of conductive agent added to the negative electrode mixture is preferably 1 to 10% by weight, and particularly preferably 2 to 5% by weight.

A binder agent for a negative electrode is, for example, polytetrafluoroethylene (PTFE), polyvinylidene fluoride (PVDF), styrene butadiene copolymer (SBR), acrylonitrile butadiene copolymer (NBR), and carboxymethyl cellulose (CMC), etc.

As for the negative electrode current collector, for example, the one made from aluminum, stainless steel, nickel, copper, titanium, calcined carbon, and copper or stainless steel with its surface treated with carbon, nickel, titanium, or silver, etc., may be used. Further, the surface of these materials can be oxidized or subjected to surface treatment so as to make the surface of the negative electrode current collector rough. Moreover, the negative electrode current collector may be in the form of, for example, a sheet, net, foil, film, punched material, lath, porous material, foamed material, fiber group, nonwoven fabric molding, etc.

<Positive Electrode>

A positive electrode contains a mixture layer including a positive electrode active material, a conductive agent, and a binder on a single or both sides of a positive electrode current collector.

As the positive electrode active material, a material that can absorb and release lithium is used. For example, as an active material, lithium metal complex oxide of cobalt, manganese, or nickel, and olivine type lithium metal phosphate, etc., may be used. These active materials can be used singly or in combination of two or more types. Examples of such complex metal oxide are, $LiCoO_2$, $LiMn_2O_4$, $LiNiO_2$, $LiCo_{1-x}Ni_xO_2(0.01<x<1)$, $LiCo_{1/3}Ni_{1/3}Mn_{1/3}O_2$, and $LiNi_{1/2}Mn_{3/2}O_4$, etc. A part of these lithium metal complex oxides can be replaced with another element. For example, the part of cobalt, manganese, or nickel may be replaced with at least one type of element selected from Sn, Mg, Fe, Ti, Al, Zr, Cr, V, Ga, Zn, Cu, Bi, Mo, and La, etc., or the part of "O" may be replaced with "S" or "F". Also, these complex metal oxides may be coated with a compound containing these other elements. An example of olivine type lithium metal phosphate is at least one type selected from the group consisting of $LiFePO_4$, $LiCoPO_4$, $LiNiPO_4$, $LiMnPO_4$, $LiFe_{1-x}M_xPO_4$, etc., (where M is at least one type selected from the group consisting of Co, Ni, Mn, Cu, Zn, and Cd, and x satisfies $0 \leq x \leq 0.5$).

The conductive agent and binder for the positive electrode are the same as those used for the negative electrode. The positive electrode current collector is, for example, aluminum, stainless steel, nickel, titanium, calcined carbon, and aluminum or stainless steel with its surface treated with carbon, nickel, titanium, or silver, or the like. The surface of these materials can be oxidized or subjected to surface treatment so as to make the surface of the positive electrode current collector rough. Moreover, the current collector may be in the form of, for example, a sheet, net, foil, film, punched material, lath, porous material, foamed material, fiber group, nonwoven fabric molding, etc.

<Non-Aqueous Electrolyte Solution>

The non-aqueous electrolyte solution is made by dissolving electrolyte salt to a non-aqueous solvent. There are no particular restrictions to the non-aqueous electrolyte solution and various types can be used.

As an electrolyte salt, the one that dissolves into non-aqueous solvent is used. For example, a lithium salt such as $LiPF_6$, $LiBF_4$, and $LiClO_4$, a lithium salt containing a chain fluoroalkyl group such as $LiN(SO_2CF_3)_2$, $LiN(SO_2C_2F_5)_2$, $LiCF_3SO_3$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, and $LiPF_5(iso-C_3F_7)$, a lithium salt containing a cyclic fluorinated alkylene chain such as $(CF_2)_2(SO_2)_2NLi$ and $(CF_2)_3(SO_2)_2NLi$, a lithium salt that contains oxalate complex as an anion such as lithium bis[oxalate-O,O']borate and lithium difluoro[oxalate-O,O']borate, etc., may be used. Among these, particularly preferable electrolyte salts are $LiPF_6$, $LiBF_4$, $LiN(SO_2CF_3)_2$, and $LiN(SO_2C_2F_5)_2$. These electrolyte salts may be used singly or in combination of two or more.

The electrolyte salts are completely dissolved in use and concentration of electrolyte salts is generally 0.3 M or more with respect to the non-aqueous solvent, more preferably 0.5 M or more, and further preferably 0.7 M or more. Further, its upper limit is preferably 2.5 M or less, more preferably 2.0 M or less, further preferably 1.5 M or less.

Examples of the non-aqueous solvent include cyclic carbonate, chain carbonate, chain ester, ether, amide, phosphoric ester, sulfonate, lactone, nitrile, and S=O bond-containing compound, etc.

The non-aqueous solvent is generally used in a mixture in order to achieve appropriate physical properties. Examples of their combinations are, a combination of cyclic carbonate and chain carbonate, a combination of cyclic carbonate, chain carbonate, and lactone, a combination of cyclic carbonate, chain carbonate, and ether, a combination of cyclic carbonate, chain carbonate, and chain ester, a combination of cyclic carbonate, chain carbonate, and nitrile, a combination of cyclic carbonate, chain carbonate, and S=O bond-containing compound, etc.

<Lithium Battery Structure>

The structure of the lithium battery of the present invention is not particularly limited. For instance, a coin type battery including a positive electrode, negative electrode, and single- or multi-layered separator, and a cylindrical battery and square type battery comprising a positive electrode, negative electrode, and roll separator, are some examples.

As a separator, an insulative thin film having high ion permeability and with a prescribed mechanical strength is used. Polyethylene, polypropylene, a cellulose paper, a glass fiber paper, polyethylene terephthalate, a polyimide micro porous film are some examples, and a multi-layered film formed by a combination of two or more of these can be also used. Also, surfaces of these separators may be coated with resin such as PVDF, silicon resin, and rubber resin, or with metal oxide particles such as aluminum oxide, silicon dioxide, and magnesium oxide. The pore diameter of the separator should be within the range useful for a battery in general, for example, 0.01 to 10 μm. The thickness of the separator should be within the range of a battery in general, for example, 5 to 300 μm.

EXAMPLES

In the following, the present invention will be specifically described using examples and comparative examples. However, the present invention is not construed as being limited to the following examples, but intended to include various combinations that can be easily analogized from the scope of the invention. Particularly, solvent combinations are not limited to those in the Examples.

[Method of Measuring Physical Properties]

(1) XRD

As a measurement device, an X-ray diffraction device that utilizes CuKα ray (RINT-TTR-III of Rigaku Corporation) was used. The conditions for the X-ray diffraction measurement were: measurement angle range (2θ) of 10° to 900, step interval of 0.02°, length of measurement time of 0.25 sec./step, radiation source of CuKα ray, tube bulb voltage of 50 kV, and current of 300 mA.

The main peak intensity of the lithium titanate (peak intensity within the diffraction angle range 2θ=18.1 to 18.5°), the main peak intensity of rutile-type titanium dioxide (peak intensity within the diffraction angle range 2θ=27.2 to 27.60), the main peak intensity of the anatase-type titanium dioxide (peak intensity within the diffraction angle range 2θ=24.7 to 25.7°), and the main peak intensity of $Li_2TiO_3$ (peak intensity within the diffraction angle range 2θ=18.2 to 18.7°) were measured.

Then, a relative value of the main peak intensity when the main peak intensity of lithium titanate is defined to be 100 was calculated for rutile-type titanium dioxide, anatase-type titanium dioxide, and $Li_2TiO_3$.

(2) Crystallite Diameter ($D_X$)

The crystallite diameter ($D_X$) of the lithium titanate powder of the present invention was determined using the Scherrer equation, the formula (5) below, from the half-peak width of the peak of the (111) plane of lithium titanate obtained under the measurement conditions of measurement angle range (2θ) of 15.8° to 21.0°, step interval of 0.01°, length of measurement time of 1 sec./step, radiation source of CuKα ray, tube bulb voltage of 50 kV, and current of 300 mA, using the same X-ray diffraction measurement device as the XRD mentioned above. In calculation of the half-peak width, the ray width by the diffractometer optical system needed to be corrected, and a silicon powder was used for the correction.

$$D_X=K\cdot\lambda/(FW(S)\cdot\cos\theta_c) \quad (5)$$

FW(S)^D=FWHM^D−FW(I)^D
FW(I)=f0+f1×(2θ)+f2×(2θ)$_2$
θ$_c$=(t0+t1×(2θ)+t2 (2θ)$^2$)/2
K: Scherrer constant (0.94)
λ: CuKα$_1$ ray wavelength (1.54059 Å)
FW (S): half-peak width (FWHM) unique to the sample
FW (I): half-peak width (FWHM) unique to the device
D: deconvolution parameter (1.3)
f0=5.108673E-02
f1=1.058424E-04
f2=6.871481E 06
θ$_c$: correction value for the Bragg angle
t0=−3.000E-03
t1=5.119E-04
t2=−3.599E-06

(3) Particle Size Distribution

For the particle size distribution measurement of the mixed powder and lithium titanate powder of the present invention, a laser diffraction/scattering particle size analyzer (Microtrac MT3300EXII of Nikkiso Co., Ltd.) was used. For the preparation of a measurement sample, ethanol was used as a measurement solvent for the case of a mixed powder and ion exchange water was used for the case of a lithium titanate powder. When the measurement sample was a powder, approximately 50 mg of the sample was added to 50 ml of the measurement solvent and then 1 cc of 0.2% aqueous solution of sodium hexametaphosphate as a surfactant, was added. The obtained slurry for the measurement was treated with an ultrasonic homogenizer. When the measurement sample was a mixed slurry composed of a mixed powder, the same method as used for when the measurement sample was a powder was used except that approximately 50 mg of the sample on a powder basis was added. The subsequent operations were performed in the same method regardless of the measurement sample types. The slurry for the measurement subjected to dispersion treatment was put into a measurement cell and then the slurry concentration was adjusted by adding the measurement solvent. When the slurry transmittance became within the appropriate range, particle size distribution was measured. From the obtained particle size distribution curve, a volume-based particle diameter (D50) of the lithium titanate powder and D95 of the mixed powder were calculated.

(4) BET Specific Surface Area (m²/g)

A BET specific surface area was measured in a one-point method using liquid nitrogen, using the automatic BET specific surface area analyzer (Macsorb HM model-1208, of Mountech Co., Ltd.).

(5) BET Diameter ($D_{BET}$)

The BET diameter ($D_{BET}$) was determined using the following formula (6) assuming that all particles constituting the powder were spheres having the same diameter.

$$D_{BET}=6/(\rho_s\times S) \quad (6)$$

Here, $D_{BET}$ is the BET diameter (μm), $\rho_s$ is the true density (g/cc) of lithium titanate, and S is the BET specific surface area (m²/g).

(6) pH

The pH was measured for the dispersion liquid where 10 g of the lithium titanate powder was dispersed to 90 g of water.

(7) $T_M/T_{Ti}$, Atomic Ratio of M to Ti for the Entire Lithium Titanate Powder (Inductively Coupled Plasma Emission Spectrometric Analysis Method)

A quantitative analysis was performed for the atomic concentrations of metal element M and Ti contained in the entire lithium titanate powder using the inductively coupled plasma emission spectrometer (SPS5100, of SII Nano Technology, Inc.). As a measurement sample, a test liquid prepared by hermetically sealing the precisely-weighed sample after adding nitric acid and hydrofluoric acid thereto, irradiating microwave for thermal decomposition, and adding ultrapure water up to a constant volume was used.

From the result of atomic concentration measurement for M and Ti, $T_M/T_{Ti}$, atomic ratio of M to Ti was calculated.

(8) $C_M/C_{Ti}$, Atomic Ratio of M to Ti on the Particle Surface of the Lithium Titanate Powder (X-Ray Photoelectron Spectroscopy (XPS))

$C_M/C_{Ti}$, atomic ratio of M atoms to Ti atoms on the particle surface of the lithium titanate powder was measured using the X-ray photoelectron spectroscopy (PHI 5000 of ULVAC-PHI, Inc.). Only when the lithium titanate powder containing Mg as the M, Al-Kα 25 W was used as the X-ray source. Whereas, when the lithium titanate powder containing metal element other than Mg as the M, Mg-Kα 400 W was used as the X-ray source.

From the peak intensities based on the number of photoelectrons of all detected elements, surface atomic concentration was calculated using a relative sensitivity factor provided by ULVAC-PHI, Inc., and $C_M/C_{Ti}$, ratio of M atoms to Ti atoms was calculated.

(9) Atomic Concentration of M and Atomic Concentration of Ti at Lithium Titanate Particle Cross Section (Scanning Transmission Electron Microscope (STEM))

For a lithium titanate particle that configures the lithium titanate powder containing M, a cross-sectional analysis of the lithium titanate particle was performed using the scanning transmission electron microscope (STEM), and atomic concentration of M and atomic concentration of Ti were measured by the energy dispersive X-ray spectroscopy (EDS). The measurement method was as follows.

The lithium titanate particle was bonded to a dummy substrate using epoxy resin, cut, bonded to a reinforcement ring, grinded, dimpled, subjected to Ar-ion milling, and finally conducted carbon vapor deposition to prepare a thin sample.

The atomic concentration of M and atomic concentration of Ti at a specific position in the obtained lithium titanate particle thin sample was measured by the energy dispersive X-ray spectroscopy (EDS) as follows. While observing the cross section of the thin sample at an accelerating voltage of 120 kV using the field-emission transmission electron microscope (with Cs correction) of JEOL Ltd., atomic concentration of M and atomic concentration of Ti at the 5 nm inner position from the sample surface along straight line drawn vertically to tangent from the contact point on the thin sample surface, and 100 nm inner position from the surface were measured using the UTW Si (Li) semiconductor detector of JEOL Ltd., provided with the microscope. The beam diameter, that is an analyzing area, was set to a 0.2 diameter circle.

[Method of Evaluating Battery Performance]

<Preparation of Electrolyte Solution>

The electrolyte solution used in a battery for evaluation of room temperature (25° C.) characteristics was prepared as follows. A non-aqueous solvent was prepared so as to achieve a content ratio of ethylene carbonate (EC): dimethyl carbonate (DMC) of 1:2. Then, $LiPF_6$ as an electrolyte salt was dissolved thereto so as to achieve its concentration of 1 M and the electrolyte solution was prepared.

In contrast, the electrolyte solution used in a battery for evaluation of low temperature (0° C.) characteristics was prepared as follows. A non-aqueous solvent was prepared so as to achieve a content ratio of ethylene carbonate (EC): ethyl methyl carbonate (EMC) of 3:7. Then, $LiPF_6$, an electrolyte salt, was dissolved thereto so as to achieve concentration of 1 M and the electrolyte solution was prepared.

Further, the electrolyte solution used in a battery for evaluation of very low temperature (−30° C.) was prepared as follows. A non-aqueous solvent was prepared so as to achieve a content ratio of propylene carbonate (PC): dimethyl carbonate (DMC) of 1:2. Then, $LiPF_6$, an electrolyte salt, was dissolved thereto so as to achieve concentration of 1 M and the electrolyte solution was prepared.

<Fabrication of an Evaluation Electrode>

90% by mass of the lithium titanate powder as for an active material, 5% by mass of acetylene black (conductive agent), 5% by mass of polyvinylidene fluoride (binder) were mixed, and 1-methyl-2-pyrolidone solvent was added thereto and then casted onto aluminum foil and dried to obtain an electrode sheet. The electrode sheet was stamped out to a disk shape having a diameter of 14 mm, pressed under a pressure of 7 tons/cm², and dried under a vacuum for 5 hours at 120° C. to fabricate an evaluation electrode.

<Fabrication of Coin Batteries>

The evaluation electrode and lithium metal (formed into a disk having a thickness of 0.5 mm and a diameter of 16 mm) were disposed facing to each other through a glass filter (a double layer of GA-100 and GF/C of Whatman) interposed therebetween. Then, three types of non-aqueous electrolyte solution prepared for use in batteries for evaluation of room temperature, low temperature, and very low temperature characteristics were added respectively and then sealed to fabricate three types of 2030-type coin batteries for evaluation of room temperature, low temperature, and very low temperature characteristics.

Using these batteries, electrochemical characteristics (initial charge-discharge characteristics and input-output performance) of the evaluation electrode were evaluated for a room temperature, low temperature, and very low temperature.

<Initial Charge-Discharge Characteristics (Room Temperature)>

When a reaction where Li is absorbed to the evaluation electrode is considered as charging, the coin-type battery for evaluation of room temperature characteristics prepared by the method explained in <Fabrication of coin batteries>above was subjected to constant-voltage and constant-current charge (CCCV charge-1) where it was charged up to 1V with a current density of 0.2 mA/cm² in a constant temperature bath of 25° C. and charged at 1V until the charge current became a current density of 0.05 mA/cm² or less, followed by constant current discharge (CC discharge-1) up to 2V at a current density of 0.2 mA/cm². The above charge and discharge cycle was repeated for 3 times and the discharge capacity in the third cycle was used as the evaluation electrode capacity.

<Evaluation of Input Performance (Room Temperature)>

Following the discharge capacity measurement in each current density, an operation of "constant current charge up to 1 V at a current density of X mA/cm² and CC discharge-1" sequence was repeated in the order of X=0.2, 1, 2, 4, and a charge capacity in each current density (0.2 mA/cm², 1 mA/cm², 2 mA/cm², and 4 mA/cm²) was measured as the input performance.

Current density was indicated by C rate where 1 C was set current density to charge or discharge evaluation electrode capacity in 1 hour. Input-out performance at 25° C. was indicated as capacity ratio where the capacity at current density of 0.2 mA/cm² was defined to be 100%. Also, a charge capacity at 3C, 25° C. was calculated from input performance evaluation results at 25° C., and the capacity ratio of charge capacity at 3 C, 25° C. when the charge capacity in the third cycle at 25° C. was to be 100% was indicated as the 3 C charge capacity ratio at 25° C. in Table 1. The charge capacity at 3 C, 25° C. was calculated by interpolation of charge capacity and C rate at the current density of 2 mA/cm² and 4 mA/cm² with a straight line.

<Input Performance (Low Temperature) (0° C.)>

The coin-type battery for evaluation of low-temperature characteristics prepared by the method explained in <Fabrication of coin batteries> above was measured for its initial charge-discharge characteristics in a constant temperature bath of 25° C. in the same method as explained in <Initial charge-discharge characteristics (room temperature)>. Then, in a constant temperature bath of 0° C., input performance at 0° C. was measured as the input performance at low temperature in the same method as explained in <Evaluation of input performance (room temperature)>above except for the temperature.

Also, from input performance evaluation results at 0° C., the charge capacity at 2 C, 0° C. was calculated, and the capacity ratio of charge capacity at 2 C, 0° C. when the charge capacity in the third cycle at 25° C. was to be 100% was indicated as the 2 C charge capacity ratio at 0° C. in Table 1. The charge capacity at 2 C, 0° C. was calculated by extrapolation of the charge capacity and C rate at current density of 1 mA/cm² and 2 mA/cm² were connected with a straight line.

<Input Performance (Very Low Temperature) (−30° C.)>

The coin-type battery for evaluation of very low temperature characteristics prepared by the method explained in <Fabrication of coin batteries>above was measured for its initial charge-discharge characteristics in a constant temperature bath of 25° C. in the same method as explained in <Initial charge-discharge characteristics (room temperature)>. Next, when a direction where Li is absorbed to the evaluation electrode is considered as charging, in a constant temperature bath of −30° C., the coin-type battery was subjected to constant-voltage and constant-current charge (CCCV charge-1) where it was charged up to 1V with a current density of 0.2 mA/cm² and charged at 1V until the charge current became a current density of 0.05 mA/cm² or less, followed by constant current discharge (CC discharge-1) up to 2V at a current density of 0.2 mA/cm². The above charge and discharge cycle was repeated for 3 times and the result of the third cycle was used as the −30° C. charge capacity and −30° C. discharge capacity. Also, −30° C. charge capacity was used as the input performance at very low temperature (−30° C.).

Reference Example 1

Figure 2:
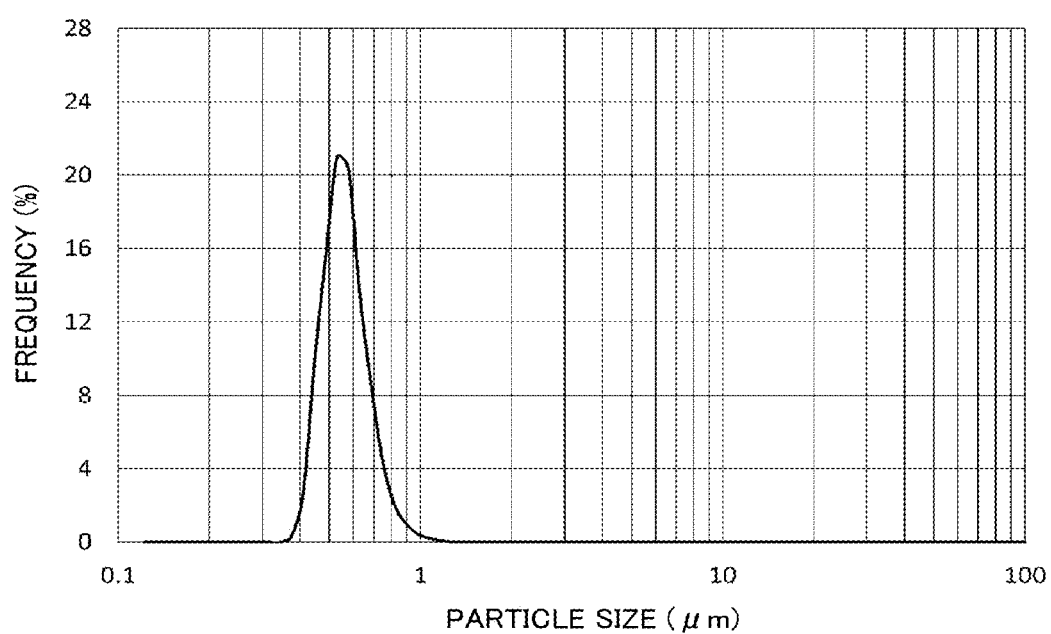
FIG. 2 is a particle size distribution curve of a mixed powder in the mixed slurry after milling in Reference Example 1.

Li$_2$CO$_3$ (average particle size of 4.6 μm) and anatase-type TiO$_2$ (average particle size of 0.6 μm) were weighed so as to achieve Li/Ti, atomic ratio of Li to Ti of 0.84 and ion exchange water was added until the solid content concentration became 41% by weight and then stirred to prepare a mixed slurry. The mixed slurry was milled and mixed using a bead mill (type; DYNO-MILL KD-20BC of Willy A. Bachofen AG, agitator material: polyurethane, vessel inner material: zirconia) where the beads were filled into the vessel by 80% by volume and controlling the agitator rotation speed to 13 m/s, slurry feed speed to 55 kg/hr, and vessel inner pressure to 0.02 to 0.03 MPa or less. The particle size distribution of the mixed powder in the mixed slurry before bead mill milling and mixing is shown in FIG. 1 and the particle size distribution of the mixed powder after bead mill milling and mixing is shown in FIG. 2. From the obtained particle size distribution in FIG. 2, D95 of the mixed powder after bead mill milling and mixing, that is a mixed powder to be subjected to calcination, was calculated. The result is shown in Table 1. The D95 of the mixed powder in this reference example was 0.73 μm.

The obtained slurry was led into the furnace core tube of the rotary-kiln type calcination furnace (furnace core tube length: 4 m, furnace core tube diameter: 30 cm, external heating type) with an adhesion prevention mechanism from the raw material supply side and then dried and calcined. At this time, slope angle for the furnace core tube was 2 degrees from the horizontal direction, the furnace core tube rotation speed was 20 rpm, and flow speed of nitrogen injected into the furnace core tube from the calcined material recovery side was 20 lit./min. Temperature of the furnace core tube was 900° C. for the raw material supply side, 900° C. for the central section, and 900° C. for the calcined material recovery side. The material was stayed at heating region for 26 minutes. Then, the calcined material recovered from the calcined material recovery side of the furnace core tube was deagglomerated using a hammer mill (AIIW-5 of Dalton Co., Ltd.) under conditions where screen mesh size was 0.5 mm, number of rotation times was 8,000 rpm, and powder feed speed was 25 kg/hr. The deagglomerated powder was sieved (mesh size of 45 μm) and the powder that passed through the sieve was collected.

For the obtained lithium titanate powder, physical properties described above were measured. Then, a coin-type battery was prepared in the method described above using the obtained lithium titanate powder as electrode material and the battery performance was evaluated. The results are shown in Table 1.

Reference Example 2

LiOH.H$_2$O (average particle size of 12.1 μm) and anatase-type TiO$_2$ (average particle size of 0.6 μm) were weighed so as to achieve Li/Ti, atomic ratio of Li to Ti of 0.84 and mixed for 30 minutes with a Henschel mixer. D95 calculated from the obtained particle size distribution of the mixed powder is indicated in Table 1. The D95 of the mixed powder in this reference example was 31.00 m. The obtained mixed powder was put into a saggar made of high-purity alumina and calcined for 6 hours at 800° C. in air atmosphere using a muffle furnace. The length of time stayed within 700 to 900° C. during heat-up was 60 minutes. Then, the calcined powder was recovered and sieved (mesh size of 45 μm) after deagglomeration in the same method as used in Reference Example 1, and the powder that passed through the sieve was collected. For the obtained lithium titanate powder, measurement of physical properties was performed as in Reference Example 1, a coin type battery was fabricated in the same way as in Reference Example 1, and the battery performance was evaluated. The results are shown in Table 1.

Reference Example 3

A mixed slurry was prepared in the same way as in Reference Example 1 except that $Li_2CO_3$ (average particle size of 2.1 μm) and anatase-type $TiO_2$ (average particle size of 0.6 μm) were weighed so as to achieve Li/Ti, atomic ratio of Li to Ti of 0.845 and mixed. The obtained mixed slurry was milled and mixed using a bead mill in the same method used in Reference Example 1. D95 calculated from the obtained particle size distribution of the mixed powder of the mixed slurry after milling and mixing using the bead mill is indicated in Table 1. The D95 of the mixed powder in this reference example was 0.73 μm.

The obtained mixed slurry was dried and calcined in the same method as in Reference Example 1 except that the mixed slurry was led into a furnace core tube where its temperature is 870° C. for the raw material supply side, 870° C. for the central section, and 870° C. for the calcined material recovery side. Then, the calcined material was sieved in the same method as in Reference Example 1 and the powder that passed through the sieve was collected. For the collected lithium titanate powder, its physical properties were measured as in Reference Example 1. Also, like in Reference Example 1, a coin type battery was prepared and its battery performance was evaluated. The results are shown in Table 1.

Reference Example 4

The lithium titanate powder was prepared in the same way as in Reference Example 1 except that bead mill milling and mixing was performed until D95 of the mixed powder became 0.44 μm and drying and calcination of the obtained mixed slurry were performed while changing the heating temperature of the furnace core tube to 710° C. for the raw material supply side, 900° C. for the central section, and 900° C. for the calcined material recovery side, and the length of time material stayed in the heating region to 40 minutes. The lithium titanate powder obtained after calcination was recovered, deagglomerated and sieved in the same way as in Reference Example 1, and the lithium titanate powder of Reference Example 4 was obtained. For the obtained lithium titanate powder, physical properties were measured as in Reference Example 1, and a coin-type battery was prepared and its battery performance was evaluated as in Reference Example 1. The results are shown in Table 1.

Example 1

Figure 3:
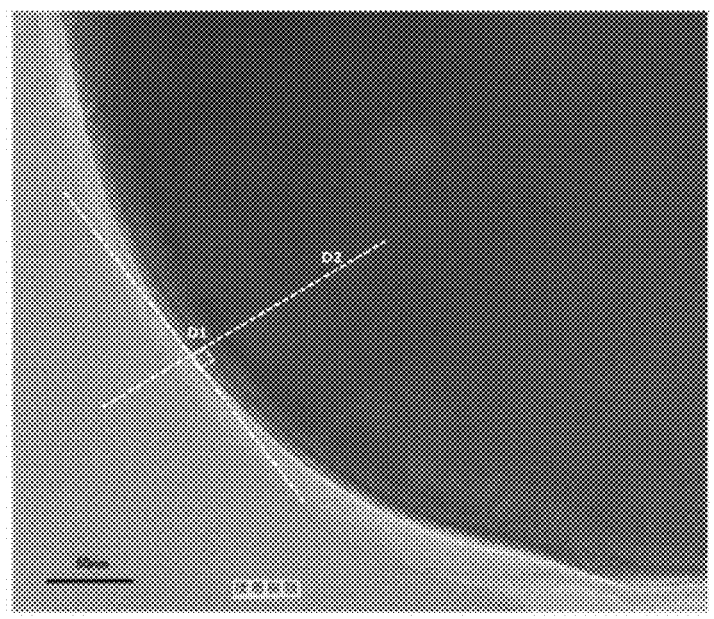
FIG. 3 is a scanning transmission electron microscopic image of a lithium titanate particle obtained in Example 1 (×500,000).

For M source (Al source), soluble aluminum acetate (where Al content amount was 7%) was used and for lithium titanate powder as base material, the lithium titanate powder obtained in Reference Example 1 was used. Then, these were weighed so as to achieve Al/Ti, atomic ratio of Al to Ti of 0.011 when mixed. Then, these were added and mixed to water having three times the amount of the lithium titanate powder. At this time, soluble aluminum acetate was dissolved 100%. The obtained slurry was heated to 90° C. while mixing to evaporate water and dried. The obtained mixed powder was subjected to heat treatment for 5 hours at 500° C. in air atmosphere and lithium titanate powder of Example 1 was obtained. For the obtained lithium titanate powder, physical properties were measured and battery performance was evaluated as described above. The results are shown in Table 1. Also, in FIG. 3, a scanning transmission electron microscopic image of lithium titanate powder obtained in Example 1 (×500,000) is shown. In FIG. 3, 5 nm inner position from a surface of the lithium titanate particle, that is the position where atomic concentration of titanium is represented as D1 in the present invention, is shown as "D1", and 100 nm inner position from the surface of the lithium titanate particle, that is the position where atomic concentration of titanium is represented as D2 in the present invention, is shown as "D2".

Example 2

The lithium titanate powder of Example 2 was prepared in the same way as in Example 1 except that the M source (Al source) was changed to aluminum lactate. For the obtained lithium titanate powder, physical properties were measured like in Reference Example 1 and a coin-type battery was prepared and its battery performance was evaluated as in Reference Example 1. The results are shown in Table 1.

Example 3

The lithium titanate powder of Example 3 was prepared in the same way as in Example 1 except that M source (Al source) was changed to aluminum sulfate 16-hydrate. For the obtained lithium titanate powder, physical properties were measured like in Reference Example 1 and a coin-type battery was prepared and its battery performance was evaluated as in Reference Example 1. The results are shown in Table 1.

Example 4

The lithium titanate powder of Example 4 was prepared in the same way as in Example 1 except that M source (Al source) was changed to aluminum fluoride, temperature for heat treatment of a mixture of the M source (Al source) and lithium titanate powder as base material was changed to 400° C., and atmosphere for the heat treatment was changed to nitrogen. For the obtained lithium titanate powder, physical properties were measured like in Reference Example 1 and a coin-type battery was prepared and its battery performance was evaluated as in Reference Example 1. The results are shown in Table 1.

Example 5

The lithium titanate powder of Example 5 was prepared in the same way as in Example 1 except that the M source was changed to magnesium sulfate heptahydrate, M source (Mg source) and lithium titanate powder as base material were weighed and mixed so as to achieve Mg/Ti, atomic ratio of Mg to Ti of 0.011 when mixed, and temperature for the heat treatment of the obtained mixture was changed to 250° C. For the obtained lithium titanate powder, physical properties were measured like in Reference Example 1 and a coin-type battery was prepared and its battery performance was evaluated as in Reference Example 1. The results are shown in Table 1.

Example 6

The lithium titanate powder of Example 6 was prepared in the same way as in Example 1 except that M source was changed to zinc acetate dihydrate, the M source (Zn source) and lithium titanate powder as base material were weighed and mixed so as to achieve Zn/Ti, atomic ratio of Zn to Ti of 0.011 when mixed, and temperature for the heat treatment of the obtained mixture was changed to 400° C. For the obtained lithium titanate powder, physical properties were measured like in Reference Example 1 and a coin-type battery was prepared and its battery performance was evaluated as in Reference Example 1. The results are shown in Table 1.

Example 7

The lithium titanate powder of Example 7 was prepared in the same way as in Example 1 except that M source was changed to indium sulfate n-hydrate (95%), the M source (In source) and lithium titanate powder as base material were weighed and mixed so as to achieve In/Ti, atomic ratio of In to Ti of 0.011 when mixed, and temperature for the heat treatment of the obtained mixture was changed to 400° C. For the obtained lithium titanate powder, physical properties were measured like in Reference Example 1 and a coin-type battery was prepared and its battery performance was evaluated as in Reference Example 1. The results are shown in Table 1.

Example 8

The lithium titanate powder of Example 8 was prepared in the same way as in Example 1 except that M source was changed to gallium (III) acetylacetone and the M source (Ga source) and lithium titanate powder as base material were weighed and mixed so as to achieve Ga/Ti, atomic ratio of Ga to Ti of 0.011 when mixed. For the obtained lithium titanate powder, physical properties were measured like in Reference Example 1 and a coin-type battery was prepared and its battery performance was evaluated as in Reference Example 1. The results are shown in Table 1.

Example 9

The lithium titanate powder of Example 9 was prepared in the same way as in Example 1 except that M source (Al source) and lithium titanate powder as base material were weighed and mixed so as to achieve Al/Ti, atomic ratio of Al to Ti of 0.005 when mixed. For the obtained lithium titanate powder, physical properties were measured like in Reference Example 1 and a coin-type battery was prepared and its battery performance was evaluated as in Reference Example 1. The results are shown in Table 1.

Example 10

The lithium titanate powder of Example 10 was prepared in the same way as in Example 1 except that M source (Al source) and lithium titanate powder as base material were weighed and mixed so as to achieve Al/Ti, atomic ratio of Al to Ti of 0.023 when mixed. For the obtained lithium titanate powder, physical properties were measured like in Reference Example 1 and a coin-type battery was prepared and its battery performance was evaluated as in Reference Example 1. The results are shown in Table 1.

Example 11

The lithium titanate powder of Example 11 was prepared in the same way as in Example 1 except that M source (Al source) and lithium titanate powder as base material were weighed and mixed so as to achieve Al/Ti, atomic ratio of Al to Ti of 0.130 when mixed. For the obtained lithium titanate powder, physical properties were measured like in Reference Example 1 and a coin-type battery was prepared and its battery performance was evaluated as in Reference Example 1. The results are shown in Table 1.

Example 12

The lithium titanate powder of Example 12 was prepared in the same way as in Example 1 except that the lithium titanate powder obtained in Reference Example 3 was used for the lithium titanate powder as base material. For the obtained lithium titanate powder, physical properties were measured like in Reference Example 1 and a coin-type battery was prepared and its battery performance was evaluated as in Reference Example 1. The results are shown in Table 1.

Example 13

The lithium titanate powder of Example 13 was prepared in the same way as in Example 1 except that the lithium titanate powder obtained in Reference Example 4 was used for the lithium titanate powder as base material. For the obtained lithium titanate powder, physical properties were measured like in Reference Example 1 and a coin-type battery was prepared and its battery performance was evaluated as in Reference Example 1. The results are shown in Table 1.

Comparative Example 1

The lithium titanate powder of Comparative Example 1 was prepared in the same way as in Example 1 except that the lithium titanate powder obtained in Reference Example 2 was used for the lithium titanate powder as base material. For the obtained lithium titanate powder, physical properties were measured like in Reference Example 1 and a coin-type battery was prepared and its battery performance was evaluated as in Reference Example 1. The results are shown in Table 1.

Comparative Example 2

The lithium titanate powder of Comparative Example 2 was prepared in the same way as in Comparative Example 1 except that the M source was changed to magnesium sulfate heptahydrate, the M source (Mg source) and lithium titanate powder as base material were weighed and mixed so as to achieve Mg/Ti, atomic ratio of Mg to Ti of 0.011 when mixed, and temperature for the heat treatment of the obtained mixture was changed to 350° C. For the obtained lithium titanate powder, physical properties were measured like in Reference Example 1 and a coin-type battery was prepared and its battery performance was evaluated as in Reference Example 1. The results are shown in Table 1.

Comparative Example 3

$Li_2CO_3$ (average particle size of 2.1 µm) and anatase-type $TiO_2$ (average particle size of 0.6 µm) were weighed so as to achieve Li/Ti, atomic ratio of Li to Ti of 0.84, added $Al_2O_3$ (average particle size of 0.5 µm) as the M source (Al source), so as to achieve Al/Ti, atomic ratio of Al to Ti of 0.030, and mixed for 30 minutes with a Henschel mixer. D95 calculated from the obtained particle size distribution of the mixed powder is indicated in Table 1. The D95 of the mixed powder in this comparative example was 3.22 µm. The obtained mixed powder was calcined in a rotary kiln in the same manner as in Reference Example 1. Then, the calcined powder was recovered and sieved (mesh size of 45 µm) after deagglomeration in the same method as in Reference Example 1, and the powder that passed through the sieve was collected. For the obtained lithium titanate powder, physical properties were measured like in Reference Example 1 and a coin-type battery was prepared and its battery performance was evaluated as in Reference Example 1. The results are shown in Table 1.

Comparative Example 4

The lithium titanate powder of Comparative Example 4 was prepared in the same way as in Comparative Example 3 except that M source was changed to magnesium hydroxide ($Mg(OH)_2$, average particle size of 0.6 µm) and the M source (Mg source) was added to the Li source and Ti source and mixed so as to achieve Mg/Ti, atomic ratio of Mg to Ti of 0.014 when mixed. For the obtained lithium titanate powder, physical properties were measured like in Reference Example 1 and a coin-type battery was prepared and its battery performance was evaluated as in Reference Example 1. The results are shown in Table 1.

Comparative Example 5

The lithium titanate powder of Comparative Example 5 was prepared in the same way as in Comparative Example 3 except that the mixed powder was prepared by preparing Ti source containing M source (Al source) in advance as follows and then mixing it with the Li source. Sodium aluminate and anatase-type $TiO_2$ (average particle size of 0.6 µm) were weighed so as to achieve Al/Ti, atomic ratio of Al to Ti of 0.030 and dispersed and dissolved into water for preparation of a slurry. Then, 0.05 mol/liter of sulfuric acid aqueous solution was added dropwise to the slurry with stirring and the pH was adjusted to 7.5. The slurry was then filtered and dried to prepare titanium oxide powder composed of titanium oxide particles coated with aluminum hydroxide. The obtained titanium oxide powder composed of titanium oxide particles coated with aluminum hydroxide (Ti source containing the M source (Al source)) was used as the M source (Al source) and Ti source. For the obtained lithium titanate powder, physical properties were measured like in Reference Example 1 and a coin-type battery was prepared and its battery performance was evaluated as in Reference Example 1. The results are shown in Table 1.

Comparative Example 6

The mixed powder was prepared in the same way as in Comparative Example 4 except that M source (Mg source) was added to Li source and Ti source so as to achieve Mg/Ti, atomic ratio of Mg to Ti of 0.030 when mixed. D95 calculated from particle size distribution of the obtained mixed powder was 3.21 m as shown in Table 1. The obtained mixed powder was put into a saggar made of high-purity alumina and calcined for 12 hours at 800° C. in air atmosphere using a muffle furnace. The length of time stayed within 700 to 800° C. during heat-up was 30 minutes. Then, the calcined powder was recovered and sieved (mesh size of 45 µm) after deagglomeration in the same method used in Reference Example 1, and the powder that passed through the sieve was collected to obtain the lithium titanate powder of Comparative Example 6. For the obtained lithium titanate powder, physical properties were measured and its battery performance was evaluated. The results are shown in Table 1.

Comparative Example 7

The lithium titanate powder of Comparative Example 7 was prepared in the same way as in Example 1 except that M source (Al source) and lithium titanate powder as base material were weighed and mixed so as to achieve Al/Ti, atomic ratio of Al to Ti of 0.014 when mixed and the obtained slurry was heated to 90° C. while mixing to evaporate water and dried without subjecting it to the heat treatment. For the obtained lithium titanate powder, physical properties were measured like in Reference Example 1, and a coin-type battery was prepared and its battery performance was evaluated as in Reference Example 1. The results are shown in Table 1.

Comparative Example 8

The lithium titanate powder of Comparative Example 8 was prepared in the same way as in Example 1 except that soluble aluminum acetate as M source was changed to calcium carbonate, Ca source and the lithium titanate powder as base material were weighed and mixed so as to achieve Ca/Ti, atomic ratio of Ca to Ti of 0.011 when mixed, and the heat treatment temperature for the obtained mixture was changed to 400° C. For the obtained lithium titanate powder, physical properties were measured like in Reference Example 1, and a coin-type battery was prepared and its battery performance was evaluated as in Reference Example 1. The results are shown in Table 1.

Comparative Example 9

The lithium titanate powder of Comparative Example 9 was prepared in the same way as in Example 1 except that soluble aluminum acetate as M source was changed to zirconium acetate, Zr source and the lithium titanate powder as base material were weighed and mixed so as to achieve Zr/Ti, atomic ratio of Zr to Ti of 0.011 when mixed, and the heat treatment temperature for the obtained mixture was changed to 400° C. For the obtained lithium titanate powder, physical properties were measured like in Reference Example 1, and a coin-type battery was prepared and its battery performance was evaluated as in Reference Example 1. The results are shown in Table 1.

Comparative Example 10

The lithium titanate powder of Comparative Example 10 was prepared in the same way as in Example 1 except that soluble aluminum acetate as M source was changed to cobalt sulfate, Co source and the lithium titanate powder as base material were weighed and mixed so as to achieve Co/Ti, atomic ratio of Co to Ti of 0.011 when mixed, and the heat treatment temperature for the obtained mixture was changed to 400° C. For the obtained lithium titanate powder, physical properties were measured as in Reference Example 1, and a coin-type battery was prepared and its battery performance was evaluated as in Reference Example 1. The results are shown in Table 1.

Comparative Example 11

The lithium titanate powder of Comparative Example 11 was prepared in the same way as in Example 1 except that M source (Al source) and lithium titanate powder as base material were weighed and mixed so as to achieve Al/Ti, atomic ratio of Al to Ti of 0.210 when mixed. When mixing, soluble aluminum acetate was dissolved 100% to water. For the obtained lithium titanate powder, physical properties were measured like in Reference Example 1, and a coin-type battery was prepared and its battery performance was evaluated as in Reference Example 1. The results are shown in Table 1.

TABLE 1

| | Preparation process | | | Lithium titanate powder | | | | | | |
|---|---|---|---|---|---|---|---|---|---|---|
| | | | | XRD peak intensity | | | | | BET | |
| | Mixed powder D95 (μm) | Lithium titanate powder | Metal M source | $Li_4Ti_5O_{12}$ | Anatase-type titanium dioxide | Rucle-type titanium dioxide | $Li_2TiO_3$ | D50 (μm) | specific surface area ($m^2/g$) | $D_{BET}$ (μm) |
| Reference Example 1 | 0.73 | — | — | 100 | 0 | 1.7 | 0 | 0.75 | 6.36 | 0.27 |
| Reference Example 2 | 31.00 | — | — | 100 | 0 | 6.0 | 2.0 | 1.12 | 3.22 | 0.54 |
| Reference Example 3 | 0.73 | — | — | 100 | 0 | 0.5 | 1.0 | 0.76 | 6.42 | 0.27 |
| Reference Example 4 | 0.44 | — | — | 100 | 0 | 1.7 | 0 | 0.61 | 8.50 | 0.205 |
| Example 1 | — | Reference Example 1 | Aluminum acetate | 100 | 0 | 1.7 | 0 | 0.78 | 5.75 | 0.302 |
| Example 2 | — | | Aluminum lactate | 100 | 0 | 1.7 | 0 | 0.77 | 5.88 | 0.296 |
| Example 3 | — | | Aluminum sulfate | 100 | 0 | 1.7 | 0 | 0.77 | 5.63 | 0.309 |
| Example 4 | — | | AlF3 | 100 | 0 | 1.7 | 0 | 0.76 | 6.27 | 0.277 |
| Example 5 | — | | Magnesium sulfate | 100 | 0 | 1.7 | 0 | 0.75 | 6.31 | 0.276 |
| Example 6 | — | Reference Example 1 | Zinc sulfate | 100 | 0 | 1.7 | 0 | 0.79 | 5.93 | 0.293 |
| Example 7 | — | | Indium sulfate | 100 | 0 | 1.7 | 0 | 0.77 | 6.02 | 0.289 |
| Example 8 | — | | Gallium acetylacetone | 100 | 0 | 1.7 | 0 | 0.80 | 5.60 | 0.311 |
| Example 9 | — | Reference Example 1 | Aluminum acetate | 100 | 0 | 1.7 | 0 | 0.77 | 6.30 | 0.276 |
| Example 10 | — | Reference Example 1 | Aluminum acetate | 100 | 0 | 1.7 | 0 | 0.80 | 5.61 | 0.310 |
| Example 11 | — | | Aluminum acetate | 100 | 0 | 1.7 | 0 | 0.74 | 6.07 | 0.287 |
| Example 12 | — | Reference Example 3 | Aluminum acetate | 100 | 0 | 0.5 | 1.0 | 0.76 | 6.40 | 0.260 |
| Example 13 | — | Reference Example 4 | Aluminum acetate | 100 | 0 | 1.7 | 0 | 0.63 | 8.40 | 0.207 |
| Comparative Example 1 | — | Reference Example 2 | Aluminum acetate | 100 | 0 | 5.8 | 2.0 | 1.80 | 3.13 | 0.556 |
| Comparative Example 2 | — | | Magnesium sulfate | 100 | 0 | 6.0 | 2.0 | 1.18 | 3.20 | 0.543 |
| Comparative Example 3 | 3.22 | — | Al2O3 | 100 | 0 | 0 | 0 | 0.96 | 4.15 | 0.419 |
| Comparative Example 4 | 3.43 | — | Mg(OH)2 | 100 | 0 | 0.5 | 0 | 0.91 | 4.90 | 0.355 |
| Comparative Example 5 | 3.32 | — | Sodium aluminate | 100 | 0 | 0 | 0 | 0.92 | 4.45 | 0.391 |
| Comparative Example 6 | 3.21 | — | Mg(OH)2 | 100 | 0 | 0 | 0 | 0.95 | 4.20 | 0.414 |
| Comparative Example 7 | — | Reference Example 1 | Aluminum acetate | 100 | 0 | 0 | 0 | 0.73 | 6.21 | 0.280 |
| Comparative Example 8 | — | Reference Example 1 | Calcium carborate | 100 | 0 | 1.7 | 0 | 0.81 | 5.50 | 0.316 |
| Comparative Example 9 | — | | Zirconium acetate | 100 | 0 | 1.7 | 0 | 0.74 | 6.70 | 0.260 |
| Comparative Example 10 | — | | Cobalt sulfate | 100 | 0 | 1.7 | 0 | 0.79 | 6.10 | 0.285 |
| Comparative Example 11 | — | Reference Example 1 | Aluminum acetate | 100 | 0 | 1.7 | 0 | 0.72 | 6.76 | 0.257 |

| | Lithium titanate powder | | | | | | |
|---|---|---|---|---|---|---|---|
| | $D_X$ (μm) | $D_{BET}/D_X$ (μm/μm) | Atomic concentration of metal element M (entire powder) $T_M/T_D$ (A) | Atomic concentration of metal element M (particle surface) $C_M/C_D$ (B) | Atomic concentration ratio of metal element M (particle surface/inner particle) D1/D2 (TEM/TEM) | Atomic concentration of metal dement M (particle surface) D1 (atm %) | Atomic concentration ratio of metal element M to Ti (particle surface) D1/$D_D$ |
| Reference Example 1 | 257 | 1.06 | — | — | — | — | — |
| Reference Example 2 | 76 | 7.11 | — | — | — | — | — |
| Reference Example 3 | 244 | 1.11 | — | — | — | — | — |
| Reference Example 4 | 82 | 2.50 | — | — | — | — | — |
| Example 1 | 273 | 1.11 | 0.011 | 0.100 | 2.7/Not detected | 2.7 | 0.09 |
| Example 2 | 263 | 1.12 | 0.011 | 0.180 | 2.4/Not detected | 2.4 | 0.09 |
| Example 3 | 278 | 1.11 | 0.011 | 0.120 | 2.2/Not detected | 2.2 | 0.08 |
| Example 4 | 244 | 1.14 | 0.011 | 0.215 | 1.2/Not detected | 1.2 | 0.04 |
| Example 5 | 241 | 1.14 | 0.011 | 0.217 | 1.3/Not detected | 1.3 | 0.05 |
| Example 6 | 253 | 1.16 | 0.011 | 0.017 | 2.4/Not detected | 2.4 | 0.09 |
| Example 7 | 247 | 1.17 | 0.011 | 0.158 | 2.0/Not detected | 2.0 | 0.07 |
| Example 8 | 245 | 1.27 | 0.011 | 0.029 | 3.0/Not detected | 3.0 | 0.12 |
| Example 9 | 245 | 1.13 | 0.005 | 0.042 | 0.6/Not detected | 0.6 | 0.03 |
| Example 10 | 252 | 1.23 | 0.023 | 0.190 | 3.2/Not detected | 3.2 | 0.15 |
| Example 11 | 259 | 1.11 | 0.130 | 0.911 | 7.5/Not detected | 7.5 | 0.35 |
| Example 12 | 241 | 1.06 | 0.011 | 0.122 | 2.3/Not detected | 2.3 | 0.08 |
| Example 13 | 85 | 2.44 | 0.011 | 0.110 | 2.8/Not detected | 2.8 | 0.10 |
| Comparative Example 1 | 77 | 7.22 | 0.011 | 0.260 | 3.4/Not detected | 3.4 | 0.13 |
| Comparative Example 2 | 76 | 7.15 | 0.011 | 0.240 | 2.1/Not detected | 2.1 | 0.07 |
| Comparative Example 3 | 257 | 1.63 | 0.030 | 0.032 | 2.0 | 0.2 | 0.01 |
| Comparative Example 4 | 238 | 1.49 | 0.014 | 0.018 | 1.3 | 0.1 | 0.01 |
| Comparative Example 5 | 251 | 1.56 | 0.030 | 0.160 | 3.3 | 0.2 | 0.01 |
| Comparative Example 6 | 133 | 3.11 | 0.030 | 0.031 | 1.0 | 0.6 | 0.02 |
| Comparative Example 7 | 255 | 1.10 | 0.014 | 9.200 | 4.0/Not detected | 40.0 | 4.0/Not detected |
| Comparative Example 8 | 260 | 1.22 | 0.011 | 0.210 | 2.2/Not detected | 2.2 | 0.08 |

TABLE 1-continued

| | | | | | | | |
|---|---|---|---|---|---|---|---|
| Comparative Example 9 | 242 | 1.07 | 0.011 | 0.114 | 2.2/Not detected | 2.2 | 0.08 |
| Comparative Example 10 | 236 | 1.21 | 0.011 | 0.102 | 2.4/Not detected | 2.4 | 0.09 |
| Comparative Example 11 | 253 | 1.02 | 0.210 | 1.044 | 1.2/Not detected | 12.0 | 0.67 |

| | Lithium titanate powder | | Battery performance | | | | |
|---|---|---|---|---|---|---|---|
| | Atomic concentration ratio of metal element M (particle surface/entire powder) B/A (XPS/ICP) | pH | 3rd cycle discharge capacity (mAh/g) | 3 C charge capacity ratio | 2 C charge capacity ratio at 0° C. | −30° C. charge capacity (mAh/g) | −30° C. discharge capacity (mAh/g) |
| Reference Example 1 | — | 11.3 | 165.6 | 95% | 72% | 35 | 34 |
| Reference Example 2 | — | 11.6 | 157.2 | 72% | 32% | 24 | 24 |
| Reference Example 3 | — | 11.4 | 163.7 | 90% | 58% | 37 | 36 |
| Reference Example 4 | — | 11.4 | 160.3 | 88% | 66% | 24 | 23 |
| Example 1 | 9.1 | 11.2 | 165.5 | 96% | 89% | 158 | 157 |
| Example 2 | 16.4 | 11.3 | 165.6 | 96% | 90% | 152 | 150 |
| Example 3 | 10.9 | 11.1 | 165.3 | 97% | 92% | 146 | 144 |
| Example 4 | 19.6 | 9.5 | 166.8 | 96% | 90% | 110 | 105 |
| Example 5 | 19.7 | 10.7 | 165.2 | 96% | 92% | 14 | 140 |
| Example 6 | 1.5 | 11.3 | 165.3 | 96% | 89% | 153 | 152 |
| Example 7 | 14.4 | 10.8 | 166.4 | 96% | 91% | 145 | 144 |
| Example 8 | 2.6 | 11.2 | 165.1 | 96% | 89% | 149 | 148 |
| Example 9 | 8.4 | 11.3 | 165.2 | 95% | 87% | 150 | 149 |
| Example 10 | 8.3 | 11.3 | 164.0 | 96% | 90% | 144 | 143 |
| Example 11 | 7.0 | 11.2 | 160.2 | 96% | 84% | 129 | 128 |
| Example 12 | 11.1 | 11.4 | 163.7 | 92% | 72% | 132 | 129 |
| Example 13 | 10.0 | 11.6 | 160.6 | 89% | 79% | 102 | 101 |
| Comparative Example 1 | 23.6 | 11.4 | 158.3 | 74% | 41% | 46 | 43 |
| Comparative Example 2 | 21.8 | 11.0 | 159.0 | 73% | 41% | 49 | 45 |
| Comparative Example 3 | 1.1 | 11.2 | 165.3 | 89% | 75% | 41 | 40 |
| Comparative Example 4 | 1.3 | 10.9 | 165.5 | 89% | 77% | 38 | 37 |
| Comparative Example 5 | 5.3 | 11.3 | 165.1 | 90% | 80% | 46 | 44 |
| Comparative Example 6 | 1.0 | 11 | 166.2 | 88% | 73% | 21 | 17 |
| Comparative Example 7 | 657.2 | 11.2 | 165.3 | 95% | 80% | 38 | 34 |
| Comparative Example 8 | 19.1 | 11.1 | 165.2 | 94% | 72% | 35 | 34 |
| Comparative Example 9 | 10.4 | 11.0 | 165.2 | 95% | 75% | 36 | 33 |
| Comparative Example 10 | 9.3 | 11.0 | 164.5 | 91% | 73% | 38 | 34 |
| Comparative Example 11 | 5.0 | 11.6 | 153.4 | 96% | 83% | 90 | 88 |

As can be seen from the above examples, an energy storage device exhibits a high initial charge-discharge capacity, excellent input-output performance, and also an extremely high charge-discharge capacity at very low temperature like −30° C. only when the lithium titanate powder according to the present invention, in which the sizes of BET diameter and crystallite diameter are of specific sizes; the size of the BET diameter relative to crystallite diameter is equal to or less than a specific value; a specific metal element is contained; concentration ratio of the metal element on the particle surface and inside the particle is equal to or greater than a specific value; and concentration ratio of the metal element on the particle surface to Ti on the particle surface is within a specific range, is applied to the energy storage device as electrode material.

What is claimed is:

1. A lithium titanate powder, comprising $Li_4Ti_5O_{12}$ as a main component, wherein, when a volume surface diameter calculated from specific surface area determined by the BET method is represented as $D_{BET}$, and when a crystallite diameter calculated from a half-peak width of the peak for (111) plane of $Li_4Ti_5O_{12}$ by the Scherrer equation is represented as $D_X$, $D_{BET}$ is 0.1 to 0.6 μm, $D_X$ is larger than 80 nm, $D_{BET}/D_X$ (μm/μm), ratio of $D_{BET}$ to $D_X$, is 3 or less, the lithium titanate powder comprises M, wherein M is at least one type of metal element selected from the group consisting of Mg, Zn, Al, Ga, and In, and in a cross-sectional analysis of a lithium titanate particle using a scanning transmission electron microscope, when atomic concentration of the M and atomic concentration of titanium measured by energy dispersive X-ray spectroscopy at the 5 nm inner position from a surface of the lithium titanate particle along a straight line drawn vertically to tangent of the lithium titanate particle surface are D1 (atm %) and Dti (atm %) respectively, and when atomic concentration of the M at 100 nm inner position from the surface of the lithium titanate particle along the straight line is D2 (atm %), following formulas (I) and (II) are satisfied:

$$D1/D2 \geq 5 \qquad (I)$$

$$0.02 \leq D1/Dti \leq 0.4 \qquad (II).$$

2. The lithium titanate powder according to claim 1, wherein a following formula (III) is satisfied:

$$0.02 \leq D1/Dti \leq 0.3 \qquad (III).$$

3. The lithium titanate powder according to claim 1, wherein a ratio $D_{BET}/D_X$ (μm/μm), is 2 or less.

4. The lithium titanate powder according to claim 1, wherein $T_M/T_{Ti}$, atomic ratio of M to Ti for the entire lithium titanate powder measured by the inductivity coupled plasma emission spectrometric analysis method is 0.001 to 0.05.

5. An active material, comprising a lithium titanate powder according to claim 4.

6. An electrode sheet, comprising an active material according to claim 5.

7. An energy storage device, comprising an active material according to claim 5.

8. A lithium-ion secondary battery, comprising an active material according to claim 5.

9. A hybrid capacitor, comprising an active material according to claim 5.

10. An active material comprising a lithium titanate powder according to claim 1.

11. An electrode sheet, comprising an active material according to claim 10.

12. An energy storage device, comprising an active material according to claim 10.

13. A lithium-ion secondary battery, comprising an active material according to claim 10.

14. A hybrid capacitor, comprising an active material according to claim 10.

* * * * *